(No Model.)
J. FEIERABEND.
PLOWING AND TILLING APPARATUS.
No. 260,673. Patented July 4, 1882.
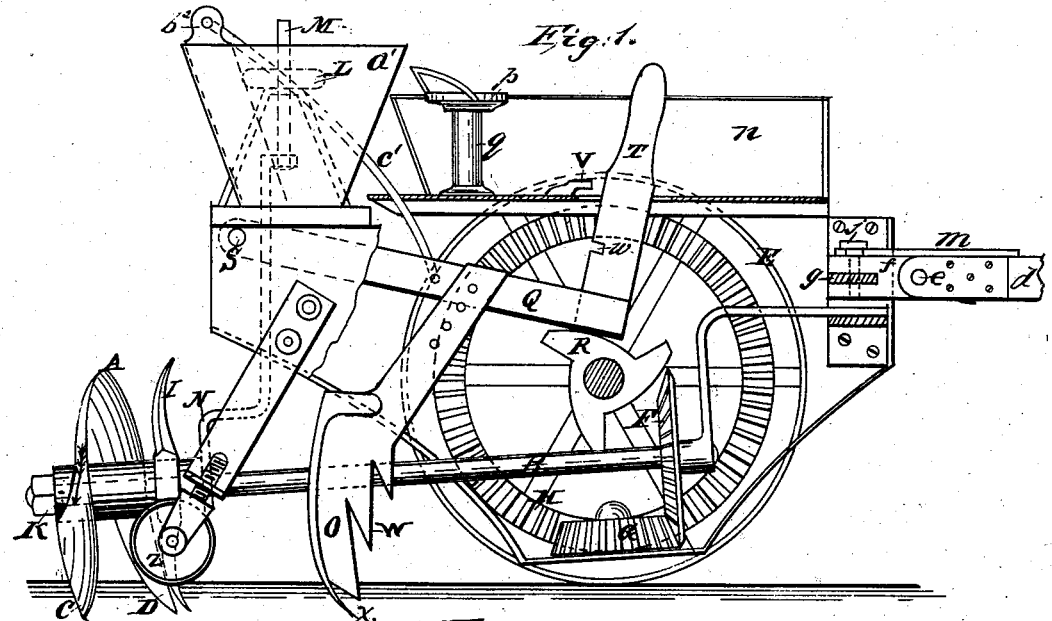
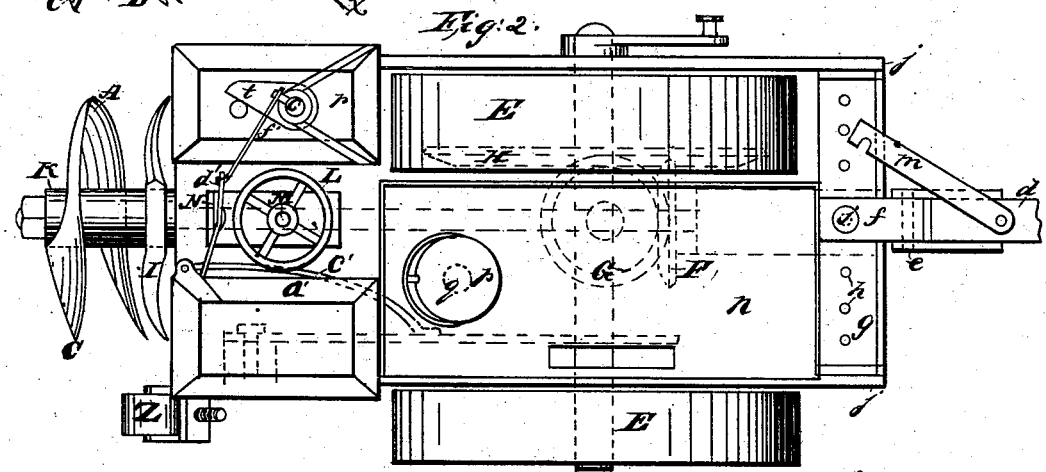
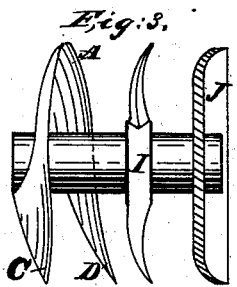
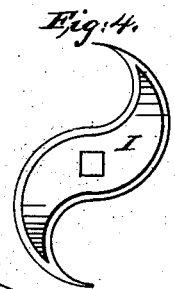
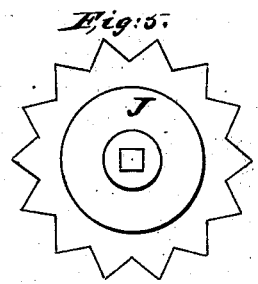
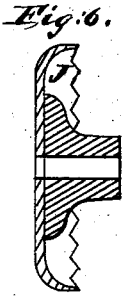
WITNESSES:
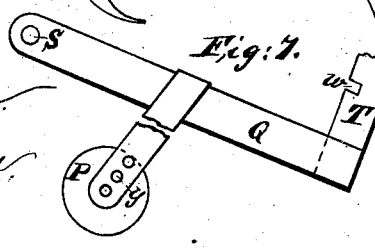
INVENTOR
Jacob Feierabend
BY A. P. Thayer,
ATTORNEY

UNITED STATES PATENT OFFICE.

JACOB FEIERABEND, OF NEW YORK, N. Y.

PLOWING AND TILLING APPARATUS.

SPECIFICATION forming part of Letters Patent No. 260,673, dated July 4, 1882.

Application filed July 13, 1881. (No model.)

*To all whom it may concern:*

Be it known that I, JACOB FEIERABEND, of the city, county, and State of New York, have invented a new and useful Improvement in Plowing and Tilling Apparatus, of which the following is a specification.

My invention consists of a rotary helical plow constructed and arranged for operation in certain novel respects, and also the combination, with the plow, of attachments and contrivances for use in connection with it for facilitating its work and adapting it to various conditions of soils, service, &c., all as hereinafter more fully described, and illustrated in the accompanying drawings, in which—

Figure 1 is a longitudinal sectional elevation of the machine, in which the more essential features of my invention are embodied. Fig. 2 is a plan view of the same machine as represented in Fig. 1. Fig. 3 is a side elevation of the rotary or helical plow as represented in one form, also shown in Figs. 1 and 2. It is also a side elevation of a "slicing" adjunct of the helical plow and a sectional elevation of another adjunct thereto, which I call a "clearer." Fig. 4 is a front elevation of the slicer shown in Fig. 3, also shown in Fig. 1. Fig. 5 is an elevation, and Fig. 6 a section, of a modified form of the clearer to be used in connection with the rotary helical plow, and which may also be substituted for it in some cases with good results; and Fig. 7 is a modification of the colter attachment shown in Fig. 1.

The essential feature of the invention is the plow A of Figs. 1, 2, and 3, the same being made of sheet metal or plates of similar form in helical, or approximately-helical, form, either continuous or sectional; also, being concavo-convex, or approximately so, in the plane of the axis around which it revolves, and also being arranged with the concave side forward or in the direction in which the plow is advanced along the ground to perform its work, the shaft on which it is revolved being also arranged in said direction, which distinguishes my improvement in this form of plow from all others heretofore employed, and is a feature of great practical importance in respect to cutting the soil easily and pulverizing it thoroughly, which I have discovered by practical demonstration.

The coil or pitch of the helix will be to the left, and the revolutions to the left hand for turning the furrows to the left and the reverse for turning a right-hand furrow. For hard soil one plow only will be used; but two or more may be used in a gang when the nature of the soil will permit, the plows being suitably arranged to the advance of the first beyond the next for the turning of the furrows one upon another in the proper order of succession.

For ridging the ground preparatary to planting, two plows, each turning so as to discharge toward the other, may be used, and likewise for cultivating plants by ridging the earth up to them, while for cutting and scraping the weeds away from the plants they may be applied so as to turn from each other. For these purposes the machine may have two parallel shafts with a plow to each, the said plows being the reverse of each other as to their pitch and motion, and being exchangeable to make ridges or the reverse. The hindmost point, C, Fig. 2, enters the ground, and by the advance of the helix, also by the advance of the machine at the same time that the plow revolves, cuts the furrow-slice very much as a thin spade or shovel does, and the slice is carried to the left on the concave side of the plow to about the level of the shaft, where it escapes partly by centrifugal force and partly by gravity. The plow enters the ground at the hindmost point, C, and it turns, as shown by the arrows of Figs. 1 and 2, so that the gain of the pitch of the screw is in the direction of the movement of the plow, whereby the cutting-edge, which inclines forward by the concavity of the front side of the plow, enters the soil both by the screwing action of its cutting-edge and by the travel of the machine. Although the heel D of the plow leaves the ground in advance of the point C along the ground, the point C, following behind heel D, takes effect on the ground left by the gap between heel D and point C. By thus lifting, carrying, and dropping the furrow-slice it must of course be very thoroughly pulverized.

It is manifest that the plow thus contrived will do efficient work with much less power than any of the common forms of plows, and probably better than obliquely-rotating disks or spiral drums rotating on axes crossing the line of draft, and it may be geared with the wheels E by any approved arrangement of means for being operated by the traction of said wheels, say by the bevel-wheels F, G, and H; or it may be worked by the direct application of steam-power mounted on the truck, and either propelling it also or not. Although it will work with an economical expenditure of power, yet in order to economize still further I propose by the method of the division of the labor to employ as adjuncts thereto the slicer I and clearer J, Fig. 3, the former being a double hook-pointed S-shaped instrument fixed on the shaft a little in advance of the plow, so as to slice off the turf, roots, and other matters, to the relief of the plow, and the clearer consists of a concavo-convex disk of a little smaller radius than the plow, and the slicer located a little ahead of the latter with its concave side forward to scrape the surface of the ground and remove any stones, roots, hard lumps, and the like, and deposit them in the previously-formed furrow, to be covered up. This clearer may have the plain edge represented in Fig. 3 or it may be notched or saw-shaped, as in Figs. 5 and 6, and in the latter form it may serve well as a plow itself, particularly for soft cultivated ground. It may also serve as a sand-cap for the protection of the journal of the plow-shaft. To facilitate the fastening of these instruments on the driving shaft, I propose to make the latter square with screw-threaded corners on which the said instruments, also having square holes, may be readily secured by check-nuts K. This form of shaft and holes is particularly favorable for the attachment of the plow when made in sections, because of the facility of adjusting them relatively to each other, which it affords, and it serves to carry all the forms of devices applied to it without the need of fastening-keys or set-screws.

In the plan here shown of gearing the plow and its adjuncts to the driving-wheels, the shaft by which it is carried is adjustable vertically to vary the depth of the plow in the earth by the screw-threaded hand-wheel L, screw M, and suspending-bar N. A winch and chain, lever, and connecting-rod, or other equivalent devices, as desired, may be employed to raise and hold the plow and other devices on the shaft B above the ground when the machine is to be moved about from place to place, or to lift the plow over stumps, stones, or other obstacles.

Besides the before-mentioned adjuncts employed with the plow for the division of the labor, so as to lessen the service of the plow itself, I also propose to employ a slanting or vertically-reciprocating saw and horned colter, O, or disk-shaped cutter P, as the nature of the work may require. These colters will be mounted on the vibrating bar Q, operated by the tappets R on the main axle, pivoted to the frame at S, and having a handle, T, the latter being notched at U, so that when raised to lift the colters out of service it may be suspended on the catch V. The tappet-wheel and colter-bar are adjustable for furrows of different widths. Besides the saw-teeth W of colter O, it is armed with a horn-shaped point, X, designed to catch in the earth on the upward movement and tear it up with powerful effect to enlarge and open the furrow to some extent for the helical plow. It also serves as a runner, on which the rear of the machine will lift and slide back.

The disk P, Fig. 7, is pivoted to its standard at Y, so that besides its vertical reciprocating motion it may turn also on its axis in a manner calculated to facilitate the cutting of sod, weeds, and the like.

Z represents a vertically-adjustable caster-wheel, arranged to run on the unplowed ground, alongside of the plow, for gaging the depth of the furrows and to hold the machine in balance for running along the road.

d represents the tongue of the machine, which is pivoted at e to a device, f, which is laterally adjustable along the bar g by holes h and pin i to vary the draft.

The notched hook-bar m engages pin i, so as to make a rigid connection between the tongue and frame when the machine is in use. When not in use the tongue may be swung up over the machine on pivot e, the hook-bar being detached and swung around away from pin i.

Above the axle and between the wheels is a box, n, for the uses of a cart or wagon box, and within the box is the driver's seat p, which is swiveled on a standard, q, for convenience of the driver in shifting about, as may be required.

To the plowing-machine thus contrived I propose to apply a seeding-hopper, r, with feeding gate or slide t, also the manuring-hopper a', with a feeding-slide, b², both of which slides may be worked from the vertically-vibrating bar Q by the rod c', bell-crank d', oscillating shaft c, and connecting-rod f', or any other suitable arrangement of devices, thus enabling the ground to be seeded and manured at the same time that it is plowed.

What I claim, and desire to secure by Letters Patent, is—

1. A rotary plow consisting of a helix of thin metal coiled edgewise around and along a central shaft that is arranged in the line of the advance of the plow when at work, said helix being concave on the forward side and convex on the rear side, and being constructed and operated by means of driving-gear, so that it enters the ground at the hind point, C, and turns in the direction whereby the screw advances, with respect to the ground, in the direction of the movement of the screw along the ground, substantially as described.

2. The combination of the slicer I with the rotary helical plow A, having concave front and convex rear sides, and arranged on a shaft whose axis is in the line of the movement of the plow along the ground, substantially as described.

3. The combination of the clearer J with the rotary helical plow A, having concave front and convex rear sides, and arranged on a shaft whose axis is in the line of the movement of the plow along the ground, substantially as described.

4. The combination, with the rotary plow A, of the reciprocating saw-colter O, having a horn, X, substantially as described.

JACOB FEIERABEND.

Witnesses:
W. J. MORGAN,
S. H. MORGAN.